United States Patent [19]

Fukushige et al.

[11] Patent Number: 4,944,613
[45] Date of Patent: Jul. 31, 1990

[54] PRINTING DEVICE

[75] Inventors: Fumio Fukushige, Fukuoka; Hisanobu Hori, Oonojou; Kiichiro Tanaka, Fukuoka, all of Japan

[73] Assignee: Matsushita Electric Industrial Co., Ltd., Osaka, Japan

[21] Appl. No.: 442,444

[22] Filed: Nov. 27, 1989

Related U.S. Application Data

[63] Continuation of Ser. No. 143,187, Jan. 13, 1988, abandoned.

[30] Foreign Application Priority Data

Jan. 13, 1987 [JP] Japan ................................. 62-5352

[51] Int. Cl.$^5$ ............................................. B41J 5/30
[52] U.S. Cl. ..................................... 400/61; 364/936; 364/944.6; 364/966.2; 364/283.2
[58] Field of Search ..................... 400/83, 61; 364/200, 364/900, 927.63, 928.3, 930, 936, 924.74, 944.6, 966.2, 234.3, 234.4, 235, 235.6, 283.2

[56] References Cited

U.S. PATENT DOCUMENTS

| | | | |
|---|---|---|---|
| 4,012,725 | 3/1977 | Spangler | 364/200 |
| 4,180,854 | 12/1979 | Walden et al. | 364/200 |
| 4,455,602 | 6/1984 | Baxter, III et al. | 364/200 |
| 4,493,027 | 1/1985 | Katz et al. | 364/200 |
| 4,525,780 | 6/1985 | Bratt et al. | 364/200 |
| 4,613,952 | 9/1986 | McClanahan | 364/578 |

*Primary Examiner*—Eugene H. Eickholt
*Attorney, Agent, or Firm*—Wenderoth, Lind & Ponack

[57] ABSTRACT

A printing device according to the present invention can be connected to various computers or the like. A large number of data items for setting various functions are already stored in a storing device of the printing device, and these data items are classified into a multi-step hierarchy to enable the selection of data items of different hierarchies, whereby the functions of the printing device can be set. The printing device is characterized in that, when data of a certain hierarchy is determined, at least one data item of the next hierarchy is arranged to be displayed by a display device, so that the number of key operations is reduced to facilitate data selection.

4 Claims, 4 Drawing Sheets

PRINTING DEVICE

This application is a continuation of now abandoned application, Ser. No. 07/143,187 filed on Jan. 13, 1988.

BACKGROUND OF THE INVENTION

1. Field of the Invention

This invention relates to a printing device for use with a personal computer or as a terminal device of an office computer.

2. Description of the Prior Art

In recent years, printing devices which enable a selection of the type of interface for connection with a host computer and the method of processing information have been developed.

Many printing devices of the type described above have DIP switches which are arranged to be appropriately switched for the purpose of selecting the aforesaid various functions.

However, as the functions of a printing device increase, the number of DIP switches required for setting the functions also increases. Therefore, the user's task of setting the DIP switches becomes complicated.

In order to solve this problem, a recently-developed printing device has various selection switches and a display device, and the user can set the various functions by looking at information displayed on the display device and operating the various selection switches.

An example of a device of the type described above will now be described.

FIG. 5 shows the structure of an operation panel portion of a printing device of the type described above, and Table 1 shows the various modes which can be set for this printing device.

As shown in this table, the user can select a desired data item from data items which have been classified into a three-step hierarchy consisting of GROUP, FIELD, and ITEM so that he can set that function for the device.

TABLE 1

| GROUP | FIELD | ITEM |
|---|---|---|
| 1. EMULATION INTERFACE SELECTION | EMULATION INTERFACE | DAISY PRINTER DOT PRINTER RS232C SERIAL CENTRONICS |
| 2. RS232C INTERFACE SET-UP | PROTOCOL | DTR+ DTR− XON/XOFF ETX/ACK |
| | BAUD RATE | 300 600 1200 2400 4800 9600 |
| | PARITY | NO EVEN ODD |
| | DATA BITS | 7 BITS 8 BITS |
| | STOP BITS | 1 BIT 2 BITS |
| 3. FONT SET-UP | RESIDENT | COURIER 10 COURIER 12 GOTHIC 15 |
| | OPTION | FONT #1 FONT #2 FONT #3 |
| 4. CONTROL CODE SET-UP | CR ACTION | CR ONLY CR+LF LF ONLY LF+CR FF ONLY FF+CR |

TABLE 1—Continued

| GROUP | FIELD | ITEM |
|---|---|---|
| | | LF+CR FF ONLY FF+CR |

The case where an operator sets 'RS232C INTERFACE SET-UP' as GROUP, 'BAUD RATE' as FIELD, and '1200' as ITEM will now be described as an example.

In this case, the operator first presses a GROUP key 26, whereby the first data item 'EMULATION INTERFACE SELECTION' of GROUP is displayed on a liquid-crystal display (abbreviated to 'LCD' hereinafter) 25. Then the operator presses a SELECT key 29 once, whereby the information displayed by the LCD 25 is changed to 'RS232C INTERFACE SET-UP'. He then presses an ENTER key 23 to select 'RS232C INTERFACE SET-UP' as GROUP. Subsequently, the operator presses a FIELD key 27, whereby 'PROTCOL' is displayed by the LCD 25, then presses the SELECT key 29 once to make the LCD 25 display 'BAUD RATE'. The operator presses an ENTER key 30 to select 'BAUD RATE' for FIELD, then presses an ITEM key 28, whereby '300' is displayed by the LCD 25. He then presses the SELECT key 29 twice, whereby the information displayed by the LCD 25 is changed to '1200'. When '1200' is displayed, '1200' can be selected as ITEM by pressing the ENTER key 30, and the sequence of operations for determining the function is completed.

However, when the above operations of determining the function is carried out, since the operator must press each of the GROUP key 26, FIELD key 27, ITEM key 28, SELECT key 29, and ENTER key 30, the operation is complicated.

Furthermore, when the operator selects the function, he must operate the keys after memorizing the hierarchy which is currently set. This leads to operator error.

SUMMARY OF THE INVENTION

An object of the present invention is to provide a printing device in which various functions can be set by simple selection operations.

Another object of the present invention is to reduce the number of keys to be operated for selecting image hierarchy when functions are to be determined.

A further object of the present invention is to facilitate operation after a hierarchy is determined, without the operator having to memorize the determined hierarchy.

DESCRIPTION OF THE PREFERRED EMBODIMENT

Referring to the accompanying drawings, an embodiment of the present invention will now be described.

Figure 1:
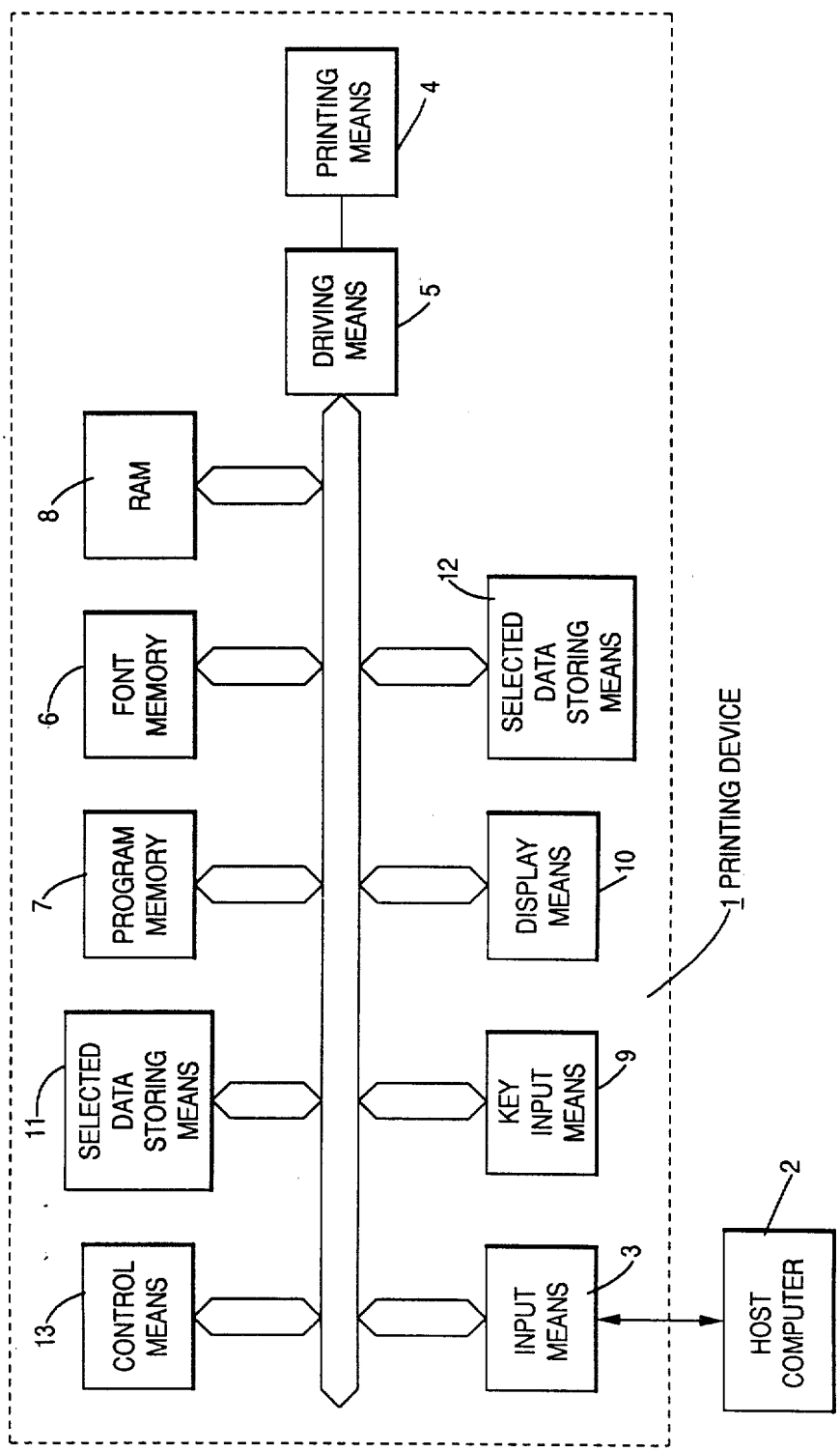
FIG. 1 is a block diagram showing the functional structure of a printing device according to an embodiment of the present invention.

FIG. 1 is a block diagram showing the structure of a printing device according to an embodiment of the present invention. In FIG. 1, reference numeral 1 represents the whole body of the printing device. Reference numeral 2 represents a host computer which is connected to the printing device 1. Reference numeral 3 represents input means for supplying print data from the host computer 2. Reference numeral 4 represents printing means for performing printing which has a printing head (omitted from illustration) and so on. Reference numeral 5 represents driving means for driving the above printing means 4. Reference numeral 6 represents a font memory in which character font data has been previously stored. Reference numeral 7 represents a program memory in which a program for controlling the operation of the device is previously stored. Reference numeral 8 represents a random access memory (abbreviated to 'RAM' hereinafter) for storing font data which has been output by the above font memory 6. Reference numeral 9 represents key input means which is operated for the purpose of selecting various functions for the above printing means 4. Reference numeral 10 represents a display device for displaying selectable data and so on which can be selected when various functions are selected. Reference numeral 11 represents selectable data storing means in which selectable data and so on which can be selected when the variable functions are selected are stored. Reference numeral 12 represents selected data storing means for storing data selected by the above key input means 9. Reference numeral 13 represents control means for controlling each of the above operations.

Figure 2:
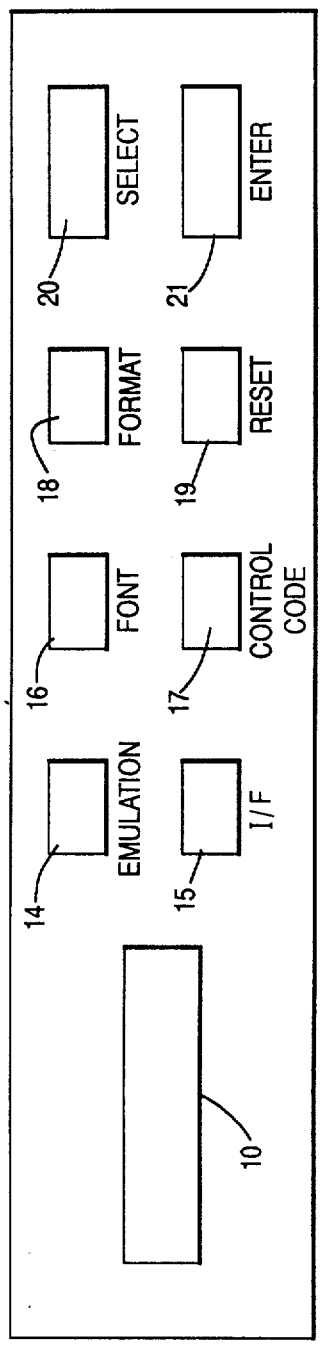
FIG. 2 is an enlarged view of the operation panel portion of a printing device according to an embodiment of the present invention.
Figure 5:
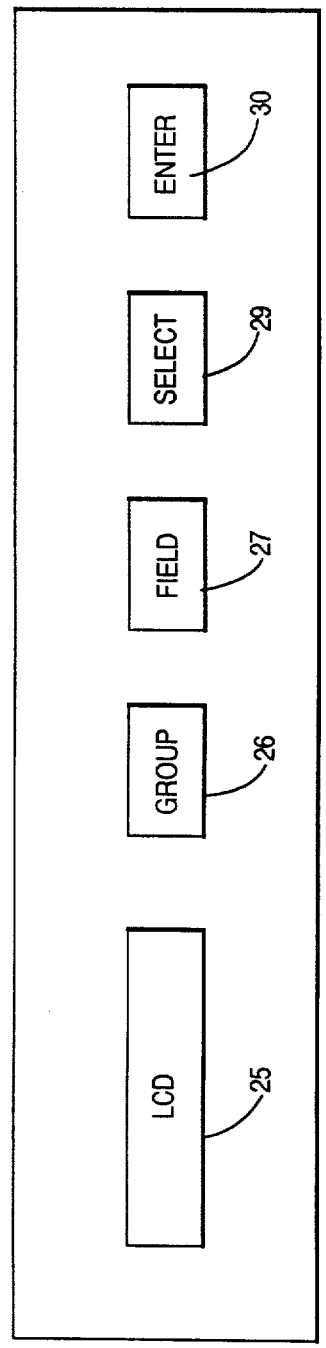
FIG. 5 is an enlarged view of an operation panel portion of the conventional printing device.

FIG. 2 is an enlarged view of an operating panel portion of the printing device according to the embodiment of the present invention. In FIG. 2, reference numeral 14 represents a EMULATION key for selecting the method of processing input data, and for setting the printing device so as to correspond to all of input data which varies in its type in accordance with a laser printer, a dot printer and a daisy printer. Reference numeral 15 represents an INTERFACE key for corresponding to the type of an interface such as an interface RS232C (standard recommended by U.S. Industries Association) or a Centronics interface for the purpose of realizing a connection with the host computer 2. Reference numeral 16 represents a FONT key for selecting the type of character font to be printed. Reference numeral 17 represents a CONTROL CODE key for selecting the method of converting a control code which is supplied by the host computer 2. Reference numeral 18 represents a FORMAT key for selecting a print format. Reference numeral 19 represents a RESET key for initializing the above control means 13 and the selected data storing means 12. Reference numeral 20 represents a SELECT key for selecting data to be set when setting various functions. Reference numeral 21 represents an ENTER key for defining the selected data item which is selected by means of the SELECT key 20 as the selected data item which is needed for setting the desired function. The key input means 9 shown in FIG. 1 comprises the EMULATION key 14, INTERFACE key 15, FONT key 16, CONTROL CODE key 17, FORMAT key 18, Reset key 19, SELECT key 20 and ENTER key 21. The display means 10 comprises a liquid crystal display.

Figure 3:
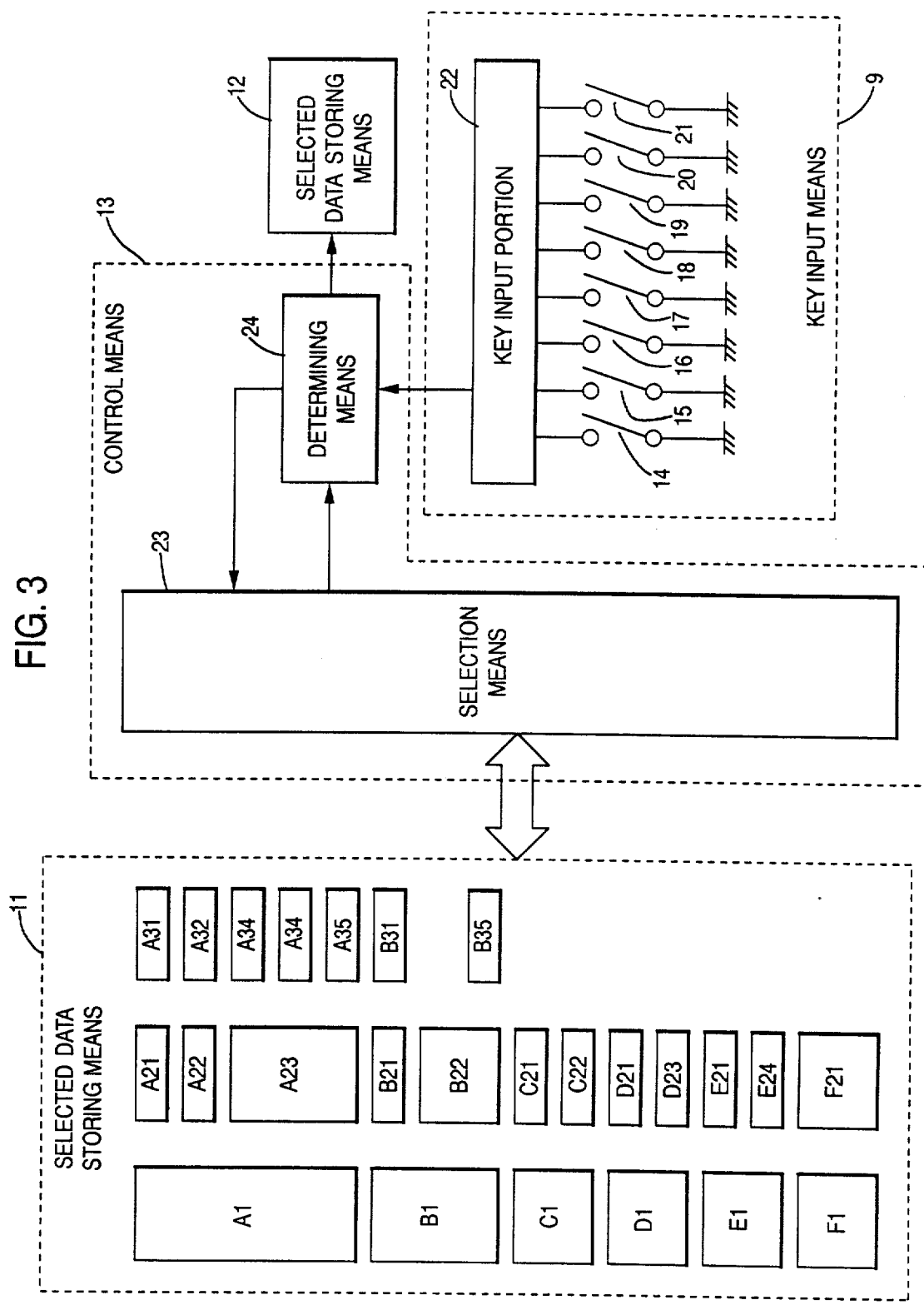
FIG. 3 is a block diagram showing the structure of an essential portion of a printing device according to the embodiment of the present invention.

FIG. 3 is a block diagram showing the structure of a circuit for the printing device according to the embodiment of the present invention. As shown in FIG. 3, the input means 9 is connected to the EMULATION key 14, INTERFACE key 15, FONT key 16, CONTROL CODE key 17, FORMAT key 18, RESET key 19, SELECT key 20, and ENTER key 21. The input means 9 has a key input portion 22 for outputting a signal corresponding to the pressed key. The selected data storing means 11 has a plurality of storing areas A1, A21,..., F21. In each of the storing areas, display data is stored for the purpose of making the above display means 10 display the selected data item which can be selected by the above SELECT key 20. Furthermore, each of the storing areas further stores an address indicating the storing area which stores the selected data item which can be selected in the next selecting operation when one of the selected data items is determined to be the selected data item needed for setting a desired function. Furthermore, stores a setting data item which is stored in the above selection data storing means 12 in accordance with the selected data item. Furthermore, in the sequential setting, each of the selected data item in the lowermost storing area includes an address which indicates the place in which data needed for restoring the printing device from a selected function mode to the original mode is stored.

As shown in Table 2, the storing area A1 stores data for selecting a method of processing the data items which are input in various forms.

TABLE 2

| 1. EMULATION MODE | AREA A1 | AREA A21 | AREA A31 |
|---|---|---|---|
|  | LASER PRINTER | PITCH | 10 |
|  |  |  | 12 |
|  |  |  | PS |
|  | DAISY PRINTER | AREA A22 SELECT CHARACTER SPACING | AREA A32 10 12 15 PS |
|  | DOT PRINTER | AREA A23 PRINT MODE | AREA A33 EMPHASIS DOUBLE PRINTING NORMAL |
|  |  | INTERNATIONAL | AREA A34 USA FRANCE GERMANY |
|  |  | ZERO CHARACTER | AREA A35 O Ø |

TABLE 3

| 2. INTERFACE | AREA B1 | AREA B21 | AREA B31 |
|---|---|---|---|
|  | CENTRONICS | PROTOCOL | DTR+ |
|  |  |  | DTR− |
|  |  |  | XON/XOFF |
|  |  |  | ETX/ACK |
|  | RS232C | AREA B22 PROTOCOL | AREA B31 DTR+ DTR− XON/XOFF ETX/ACK |

TABLE 3—Continued

| | | |
|---|---|---|
| | BAUD RATE | AREA B32 |
| | | 300 |
| | | 600 |
| | | 1200 |
| | | 2400 |
| | | 4800 |
| | | 9600 |
| | PARITY | AREA B33 |
| | | NO |
| | | EVEN |
| | | ODD |
| | DATA BITS | AREA B34 |
| | | 7 BITS |
| | | 8 BITS |
| | STOP BITS | AREA B35 |
| | | 1 BIT |
| | | 2 BITS |

TABLE 4

| | | |
|---|---|---|
| 3. FONT | AREA C1 | AREA C21 |
| | RESIDENT | COURIER 10 |
| | | COURIER 12 |
| | | GOTHIC 15 |
| | OPTION | AREA C22 |
| | | FONT #1 |
| | | FONT #2 |
| | | FONT #3 |
| 4. CONTROL CODE | AREA D1 | AREA D21 |
| | CR ACTION | CR ONLY |
| | | CR+LF |
| | LF ACTION | AREA D22 |
| | | LF ONLY |
| | | LF+CR |
| | FF ACTION | AREA D23 |
| | | FF ONLY |
| | | FF+CR |
| 5. FORMAT | AREA E1 | AREA E21 |
| | PAGE | PORTRAIT |
| | ORIENTATION | LANDSCAPE |
| | LINE PER INCH | AREA E22 |
| | | * * * PER INCHES |
| | PAGE LENGTH | AREA E23 |
| | | * * * INCHES |
| | TOP MARGIN | AREA E24 |
| | | * * * OF LINES |
| 6. RESET | AREA F1 | |
| | POWER ON | |
| | RESET | |
| | PAGE BUFF. | |
| | CLEAR | |
| | RECEIVE BUFF. | |
| | CLEAR | |

A21 stores data for setting a character pitch when data formed in a type to be printed by a laser printer is supplied to the input means 3. A 22 stores data for setting a character pitch when data formed in a type to be printed by a daisy printer is supplied to the input means 3. A23 stores data for setting a printing state when data formed in a type to be printed by a dot printer is supplied to the input means 3, data for setting a language to be printed, and data for determining whether font 0 or 0 is used. The storing areas A31, A32, A33, A34, and A35 respectively store data corresponding to data in the above storing areas A21, A22, and A23.

As shown in Table 3, a storing area B1 stores data for selecting the method of processing data in accordance with the difference in the interface. A storing area B21 stores data for setting a protocol when Centronics interface is selected. A storing area B22 stores data for setting protocol, transferring speed, parity check, the number of bits of data, and stop bit. Storing areas B31, B32, B33, B34, and B35 respectively store data corresponding to data in the above storing areas B21 and B22.

As shown in table 4, data for setting the type of font is stored in a storing area C1, data for a setting concerning to a control code is stored in the storing area D1, data for setting a print format is stored in the storing area E1, data for resetting and initializing the printing device 1 is stored in the storing area F1, and data items corresponding to each of data items in the above storing areas C1, D1, and E1 are respectively stored in the storing areas C21, C22, D21, D22, D23, E21, E22 and E23.

As shown in FIG. 3, reference numeral 23 represents selection means for selecting either one of storing areas A1 to F1 in the selected data storing means 11. Reference numeral 24 represents determining means for determining the input key and outputting a signal for converting selected data or hierarchy. The selected data storing means 12 specifically has a plurality of flags (omitted from illustration) for the purpose of treating the flag which corresponds to the selected data item whenever the ENTER key 21 is pressed.

Figure 4:
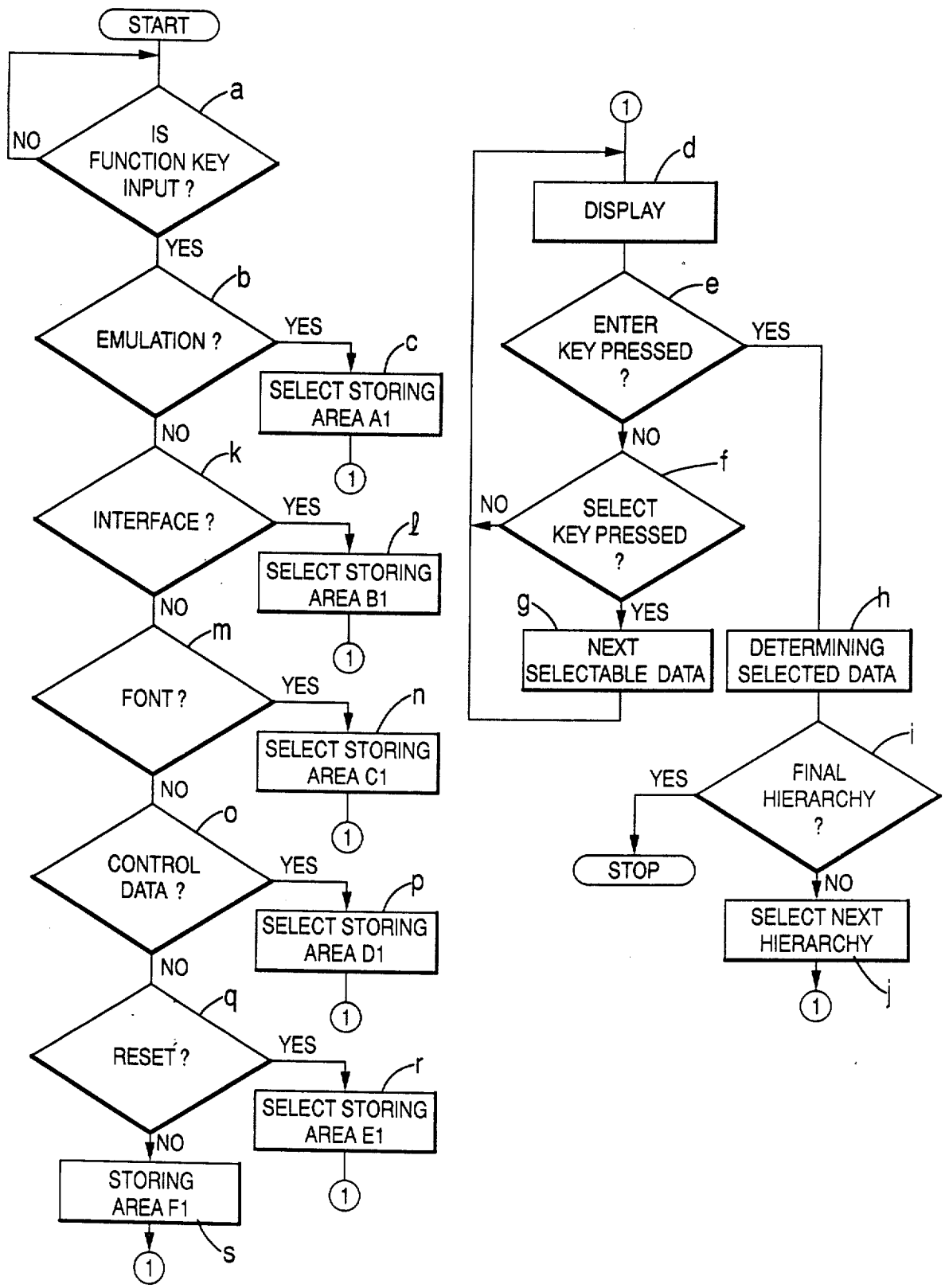
FIG. 4 is a flow chart showing a part of the operation of the printing device according to the embodiment of the present invention.

The printing operation of the printing device according to the embodiment of the present invention whose structure has been described above will now be described with reference to a flow chart shown in FIG. 4.

The input means 3 receives data from the host computer 2, and the control means 13 stores in RAM 8 the font which corresponds to the above data referring to the font memory 6. Then the control means 13 controls the driving means 5 and the printing means 4 so as to perform printing confirming the states of the flag of the selected data storing means 12.

The operating procedure of the printing device according to the embodiment of the present invention when setting various functions will now be described.

For example, the operating procedure in the case where an operator has selected 'LASER PRINTER' in the 'EMULATION MODE' and is going to select 10-pitch as the character pitch will now be described.

In the initial stage of the procedure, 'OFF LINE' is assumed to be displayed by the display means 10. When the operator operates the EMULATION key 14, it is determined by the determining means 24 in step (a) whether any one of the EMULATION key 14, INTERFACE key 15 (abbreviated to I/F in the figure), FONT key 16, CONTROL CODE key 17, FORMAT key 18 or the RESET key 19 has been operated. The determining means 24 in step (b) determines that the EMULATION key 14 has been operated. The selection means 23 in step (c) selects the storing area A1 and make the data items only in this storing area A1 selectable by way of operation of the above SELECT key 20. The display means 10 in step (d) displays the data item 'LASER PRINTER' which is stored in the front portion of the storing area A1.

Although the operator in this state can change the selected data item which is displayed by the display means 10 by operating the SELECT key 20 so as to make the display means 10 display 'DAISY PRINTER' or 'DOT PRINTER', since the operator in this example is going to select 'LASER PRINTER', the ENTER key 21 is operated in the state when 'LASER PRINTER' is displayed by the display means 10.

As a result of this, the determining means 24 in step (e) determines that the ENTER key 21 has been operated. The determining means 24 then in step (h) apply a predetermined treatment to the flag of a plurality of flags in the selected data storing means 12 which the flag corresponds to the 'LASER PRINTER'. Then it is determined by the determining means 24 whether the storing area A1 is the deepest hierarchy depending upon the address which is stored together with the selected data item 'LASER PRINTER' in the storing area A1. Since it is determined that the storing area A1 is not the deepest hierarchy in this state, the selection means 23 in step (j) selects the storing area A21 from the storing areas which are positioned in the next deep hierarchies which is indicated by the address stored together with the selected data item 'LASER PRINTER'. As a result of this, a data item is made selectable only from the data items in the storing area A21 by way of operating the above SELECT key 20.

The display means 10 in step (d) displays the data item 'PITCH' which is stored at the front portion of the storing area A21.

In this example, since the operator intends to select 'PITCH' from the selectable data, the operator operates the ENTER key 21 in this state.

As a result of this, the determining means 24 in step (e) determines that the ENTER key 21 has been operated, and applies in step (h) a predetermined treatment to the flag of a plurality of flags in the above selected data storing means 12 which corresponds to the selected data item 'PITCH'. The determining means 24 then determines whether the storing area A21 is the deepest hierarchy. In this case, since it is determined that the storing area A21 is not the deepest hierarchy, the selecting means 23 in step (j) selects the storing area A31 from the next deep hierarchies which is indicated by the address stored together with the selected data item 'PITCH'. As a result of this, a data item is made selectable from the data items in the storing area A31 by operating the SELECT key 20. The display means 10 in step (d) displays the data item '10' which is stored in the front portion of the storing area A31.

In this example, since the operator intends to select as a pitch of '10-pitch', the operator in this state operates the ENTER key 21.

As a result of this, the determining means 24 in step (e) determines that the ENTER key 21 has been operated, and applies in step (h) a predetermined treatment to the flag which corresponds to the selected data item '10' of a plurality of flags in the selected data storing means 12. Then the determining means 24 determines whether the storing area A31 is the deepest hierarchy by way of confirming the address which is stored together with the selected data item '10'. In this case, since the storing area A31 is the deepest hierarchy, the control means finishes its sequential operations for setting functions, and is released from the mode for setting functions, and is returned to the initial mode in which the setting of data has not been started.

In the similar manner as the 'EMULATION MODE' is selected, the function can be selected in the similar operation as that mentioned above in the mode 'INTERFACE', 'FONT', 'CONTROL CODE', 'RESET' or 'FORMAT'.

When the 'FORMAT' shown in Table 4 is determined, '* PER INCHES', '* INCHES' and '* OF LIENS' are respectively stored in the storing area E22, storing area E23, and the storing area E24. The portion * is set by means of a key (omitted from illustration).

As described above, according to this embodiment, the various functions of the printing device can be set in a dialogue manner looking at the display means. Furthermore, the operator is not needed to memorize the hierarchy of the selected data items, therefore, the operator easily select the selection data by operating the SELECT key and the ENTER key.

In this embodiment, although '* PER INCHES', '* INCHES', and '*** OF LINES' in the storing area E22, the storing area E23, and the storing area E24 are arranged to be set by a key which is provided separately, they can be set in the manner similar to the other setting operation by way of providing several selectable data items in the hierarchy one step hierarchy below.

I claim:

1. A device for selecting data items denoting operating conditions of a printer, said device comprising:
   a first storing means for storing a plurality of data groups, each of said plurality of data groups having at least a first hierarchy data set and a second hierarchy data set, each data set having at least two data items;
   input means for selecting one of said at least two data items of at least one of said data sets, said input means including a data group input key for each of said plurality of data groups and a select key and an enter key;
   a second storing means for storing selected data items;
   a display means for displaying a data item;
   a control means for controlling said first storing means and display means and said second storing means and said input means, wherein upon activation of a data group input keys aid control means causes said display means to display a first data item of the first hierarchy data set of a data group corresponding to the activated data group key, and wherein upon activation of said select key said control means causes said display to display a next data item of a hierarchy data set of the data group corresponding to the activated data group key, and wherein upon activation of said enter key said control means stores in said second storage means a data item displayed on said display and then causes said display to display a first data item of a next hierarchy data set of the data group corresponding to the activated data group key; and,
   a determining means for determining, upon activation of said enter key, whether a next hierarchy data set is present within the data group corresponding to the activated data group key, wherein upon activation of said enter key and upon determining that there is an absence of a next hierarchy data set said control means releases the printer from a mode for selecting operating conditions.

2. A device as recited in claim 1, wherein said first storing means, said input means, said second storing means, said display means, said control means, and said determining means are coupled together via a common bus.

3. In a printer the improvement comprising:
   a first storing means for storing a plurality of data groups, each of said plurality of data groups having at least a first hierarchy data set and a second hierarchy data set, each data set having at least two data items;
   input means for selecting one of said at least two data items of at least one of said data sets, said input means including a data group input key for each of said plurality of data groups and a select key and an enter key;

a second storing means for storing selected data items;

a display means for displaying a data item;

a control means for controlling said first storing means and display means and said second storing means and said input means, wherein upon activation of a data group input key said control means causes said display means to display a first data item of the first hierarchy data set of a data group corresponding to the activated data group key, and wherein upon activation of said select key said control means causes said display to display a next data item of a hierarchy data set of the data group corresponding to the activated data group key, and wherein upon activation of said enter key said control means stores in said second storage means a data item displayed on said display and then causes said display to display a first data item of a next hierarchy data set of the data group corresponding to the activated data group key; and, a determining means for determining, upon activation of said enter key, whether a next hierarchy data set is present within the data group corresponding to the activated data group key, wherein upon activation of said enter key and upon determining that there is an absence of a next hierarchy data set said control means releases the printer from a mode for selecting operating conditions.

4. In a printer as recited in claim 3, wherein said first storing means, said input means, said second storing means, said display means, said control means, and said determining means for coupled together via a common bus.

* * * * *